(12) United States Patent
Linnen et al.

(10) Patent No.: US 12,093,537 B2
(45) Date of Patent: Sep. 17, 2024

(54) DATA STORAGE DEVICE AND METHOD FOR SWAP DEFRAGMENTATION

(71) Applicant: Western Digital Technologies, Inc., San Jose, CA (US)

(72) Inventors: Daniel J. Linnen, Limestone, TN (US); Ramanathan Muthiah, Bangalore (IN); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/220,355

(22) Filed: Jul. 11, 2023

(65) Prior Publication Data

US 2024/0176501 A1    May 30, 2024

Related U.S. Application Data

(60) Provisional application No. 63/428,488, filed on Nov. 29, 2022.

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
CPC .... G06F 3/0617; G06F 3/0619; G06F 3/0659; G06F 3/0673; G06F 16/1724; G06F 16/1727
USPC ....................................................... 711/154
See application file for complete search history.

(56) References Cited

U.S. PATENT DOCUMENTS

| | | | | |
|---|---|---|---|---|
| 8,166,276 | B2* | 4/2012 | Serebrin | G06F 9/34 711/206 |
| 9,971,685 | B2* | 5/2018 | Gayman | G06F 12/0646 |
| 2006/0085663 | A1* | 4/2006 | Sutoh | G06F 11/1464 714/E11.13 |
| 2011/0119455 | A1* | 5/2011 | Tsai | G06F 3/0608 711/E12.001 |

(Continued)

OTHER PUBLICATIONS

I. Ataie and W. Yu, "SVAGC: Garbage Collection with a Scalable Virtual Address Swapping Technique," Sep. 2022 IEEE International Conference on Cluster Computing (Cluster), Heidelberg, Germany, 2022, pp. 357-368, doi: 10.1109/Cluster51413.2022.00047. (Year: 2022).*

(Continued)

*Primary Examiner* — Reginald G Bragdon
*Assistant Examiner* — Aaron D Ho
(74) *Attorney, Agent, or Firm* — Crowell & Moring LLP

(57) ABSTRACT

A data storage device stores files in its memory. The files may be logically fragmented in that various parts of a given file may be located in non-continuous logical addresses, which can be disadvantageous. The host can send a request to the data storage device to reduce such logical fragmentation. For example, the host can send a swap command to the data storage device, in response to which the data storage device swaps the logical addresses of data fragments of two different files. This results in the logical address of one or both of the data fragments being continuous with the logical address of another data fragment of the same file. This logical address swap can take place without physically moving the data in the memory.

20 Claims, 12 Drawing Sheets

Starting Point

File A has 3 notes in FS, File B has 3 notes in FS

File A has 2 notes in FS, File B has 2 notes in FS

File A has 2 notes in FS, File B has 1 note in FS

Ending Point 2x swaps going from 6 file fragments to 3 file fragments

(56) References Cited

U.S. PATENT DOCUMENTS

| | | | |
|---|---|---|---|
| 2011/0153674 A1* | 6/2011 | East | G06F 16/22 |
| | | | 711/E12.001 |
| 2014/0223083 A1 | 8/2014 | Park et al. | |
| 2014/0229657 A1 | 8/2014 | Karamov et al. | |
| 2015/0220268 A1 | 8/2015 | Duzly et al. | |
| 2017/0337212 A1 | 11/2017 | Hayasaka et al. | |
| 2019/0065395 A1 | 2/2019 | Fujita | |
| 2021/0223979 A1* | 7/2021 | Li | G06F 3/064 |
| 2022/0043747 A1* | 2/2022 | Palmer | G06F 3/0608 |
| 2023/0236966 A1* | 7/2023 | Yarimi | G06F 3/0638 |
| | | | 711/170 |

OTHER PUBLICATIONS

Guangyu Zhu, Jeongeun Lee, and Yongseok Son. May 2022. An efficient and parallel file defragmentation scheme for flash-based SSDs. In Proceedings of the 37th ACM/SIGAPP Symposium on Applied Computing (SAC '22). Association for Computing Machinery, New York, NY, USA, 1208-1211. (Year: 2022).*

Hahn, Sangwook Shane, Sungjin Lee, Cheng Ji, Li-Pin Chang, Inhyuk Yee, Liang Shi, Chun Jason Xue, and Jihong Kim. "Improving file system performance of mobile storage systems using a decoupled defragmenter." In 2017 USENIX Annual Technical Conference (USENIX ATC 17), pp. 759-771. 2017. (Year: 2017).*

U.S. Appl. No. 17/865,641, filed Jul. 15, 2022, entitled "Management of Host File-System Defragmentation in a Data Storage Device."

U.S. Appl. No. 17/865,660, filed Jul. 15, 2022, entitled "Logical-to-Physical Mapping for Defragmentation of Host File System in a Data Storage Device."

NVM Express® NVM Command Set Specification, Revision 1.0a; downloaded from the Internet on Jul. 10, 2023 at NVMe-NVM-Command-Set-Specification-1.0a-2021.07.26-Ratified.pdf (nvmexpress.org); NVM Express, Inc.; Jul. 23, 2021; 105 Pages.

* cited by examiner

DATA STORAGE DEVICE AND METHOD FOR SWAP DEFRAGMENTATION

CROSS-REFERENCE TO RELATED APPLICATION

This application claims priority to U.S. provisional patent application No. 63/428,488, filed Nov. 29, 2022, which is hereby incorporated by reference.

BACKGROUND

A host can write data to and read data from a data storage device. The host provides a logical address in a read or write command, and the data storage device uses a logical-to-physical address translation table to translate the logical address to a physical address in the data storage device's memory. Over time, logical addresses of a given file stored in the memory can be fragmented, where data of the file is associated with non-continuous logical addresses. To reduce this fragmentation, the host can read data associated with the non-continuous logical addresses and write the data back to the data storage device using new, continuous logical addresses. That results in the data storage device reading the data from its original physical locations and re-writing the data to new physical locations. The data storage device would also update the logical-to-physical address translation table to associate the new, contiguous logical addresses with the new physical addresses in the memory that now store the data.

DETAILED DESCRIPTION

The following embodiments generally relate to a data storage device and method for swap defragmentation. In one embodiment, a data storage device is provided comprising a memory and a controller. The controller is configured to receive a swap request to reduce logical fragmentation of first and second files stored in the memory, wherein the swap request identifies first and second logical addresses to be swapped, the first logical address being associated with a data fragment of the first file and the second logical address being associated with a data fragment of the second file; and execute the swap request by: associating the first logical address with the data fragment of the second file instead of the data fragment of the first file; and associating the second logical address with the data fragment of the first file instead of the data fragment of the second file.

In another embodiment, a method is provided that is performed in a data storage device comprising a memory storing a data fragment of a first file and a data fragment of a second file, wherein a first logical address is associated with the data fragment of the first file and a second logical address is associated with the data fragment of the second file. The method comprises receiving a request to reduce logical fragmentation of the first and second files; and executing the request by swapping the first and second logical addresses.

In yet another embodiment, a data storage device comprising: a memory configured to store a data fragment of a first file and a data fragment of a second file, wherein a first logical address is associated with the data fragment of the first file and a second logical address is associated with the data fragment of the second file; and means for swapping the first and second logical addresses to reduce logical fragmentation of the first and second files without moving the data fragments of the first and second files in the memory. Other embodiments are provided and can be used alone or in combination.

Figure 1A:
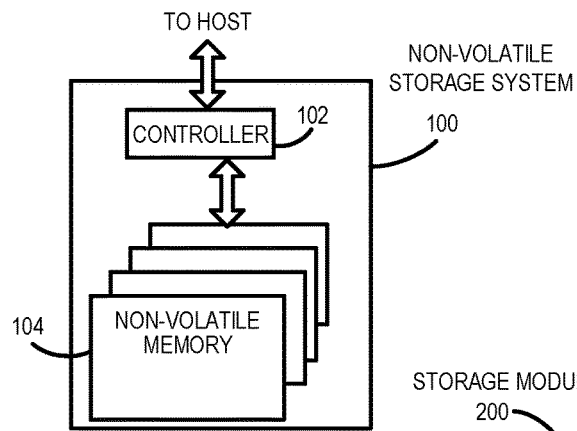
FIG. 1A is a block diagram of a non-volatile storage system of an embodiment.
Figure 1B:
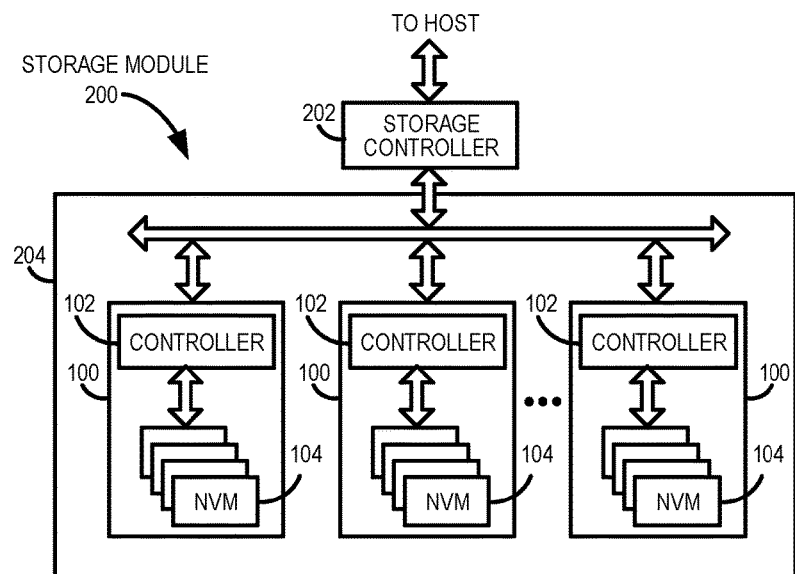
FIG. 1B is a block diagram illustrating a storage module of an embodiment.
Figure 1C:
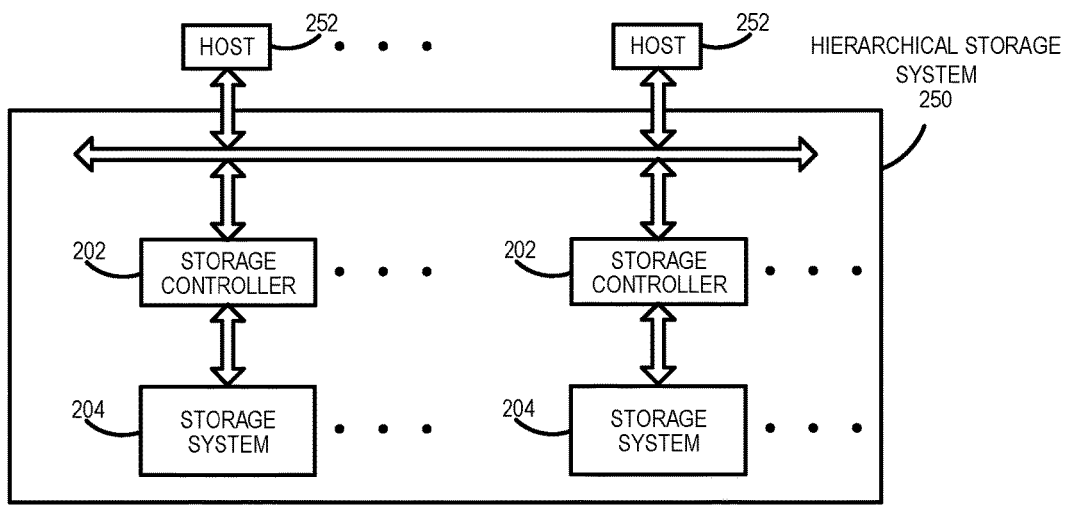
FIG. 1C is a block diagram illustrating a hierarchical storage system of an embodiment.

Turning now to the drawings, storage systems suitable for use in implementing aspects of these embodiments are shown in FIGS. 1A-1C. A storage system is sometimes referred to herein as a data storage device (DSD), which refers to a device that stores data (e.g., hard disk drives (HDDs), solid state drives (SSDs), tape drives, hybrid drives, a RAID array, shingled magnetic recording (SMR) HDDs having a mapping/indirection level, etc.). FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level (one-bit per cell) cells (SLC) or multiple-level cells (MLC), such as two-level cells, triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
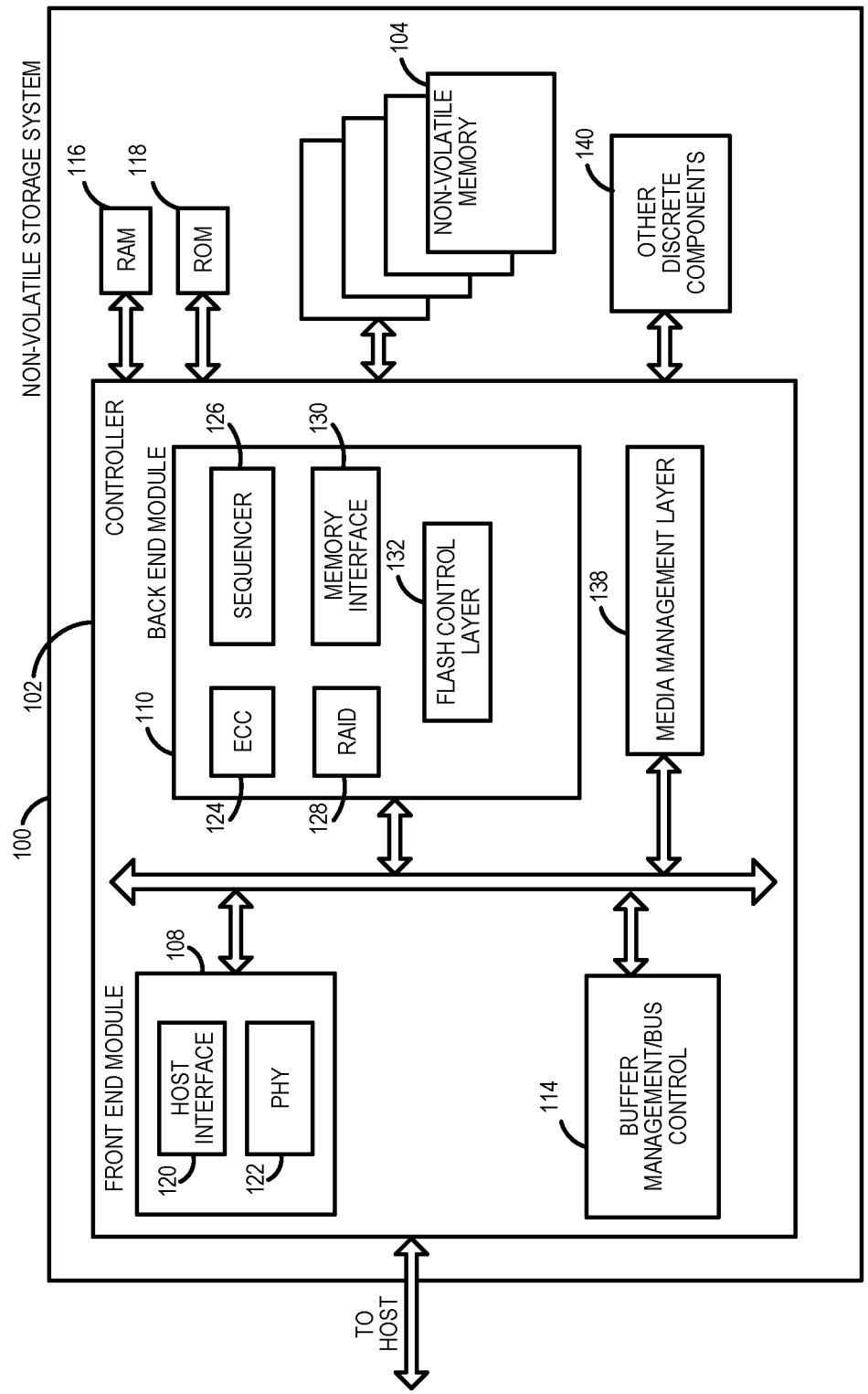
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
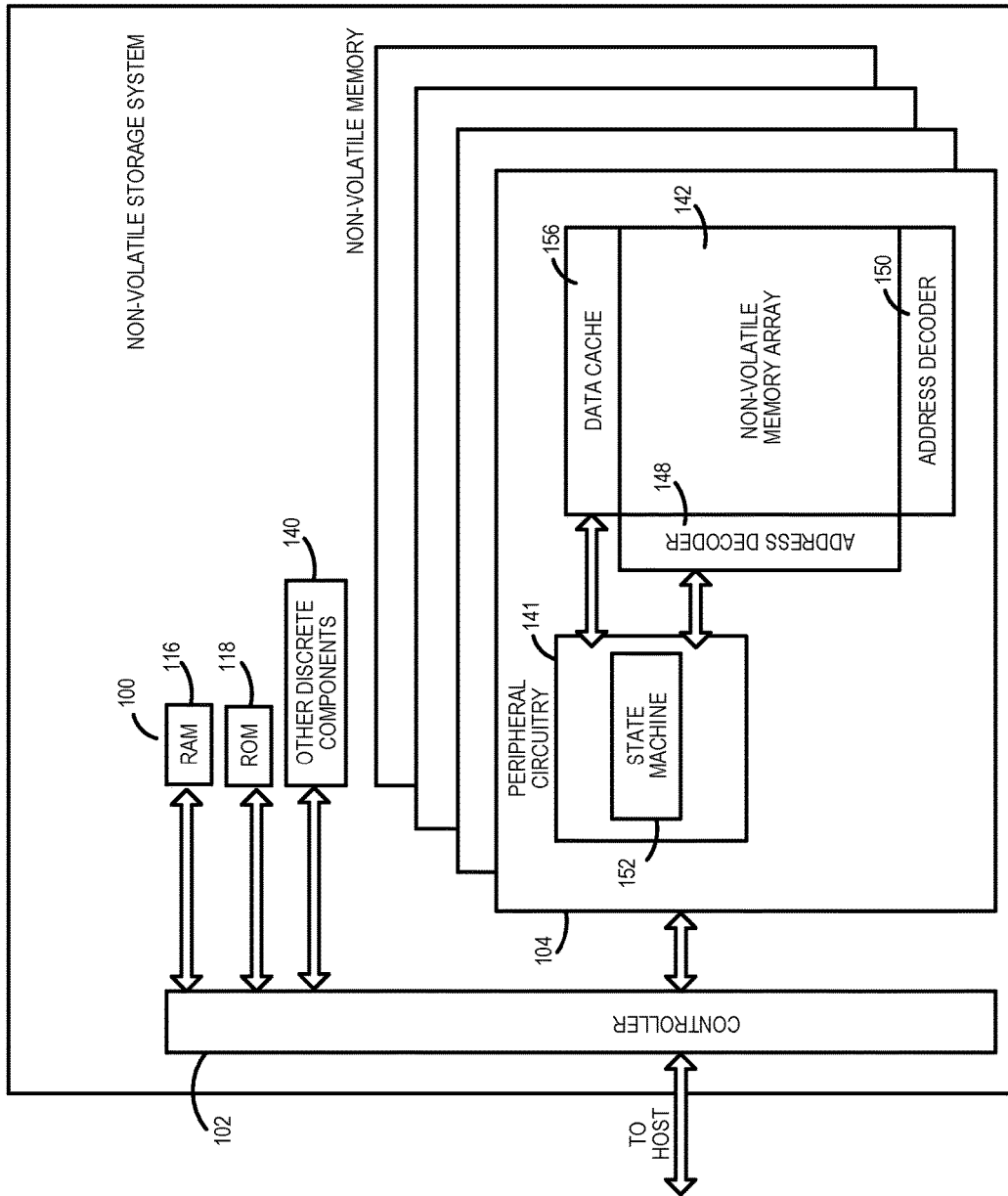
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
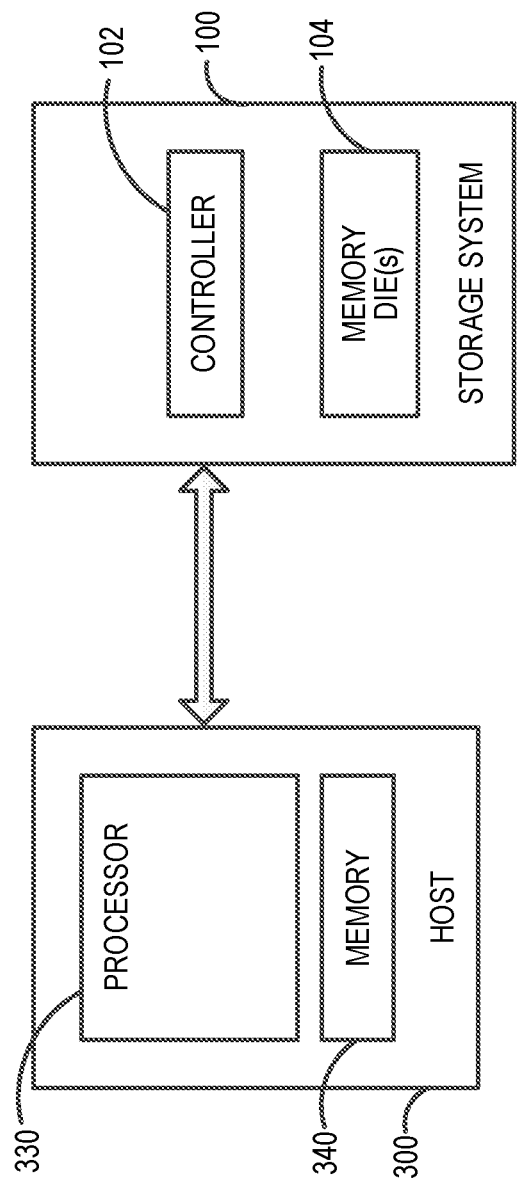
FIG. 3 is a block diagram of a host and storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

NAND flash-based data storage devices read and write data in units known as pages. For example, 128 pages can constitute a single data block. Before any data can be written or programmed in the memory 104, an entire block of data that is no longer needed or valid may have to be erased. An internal housekeeping operation referred to as "garbage collection" or "GC" is used to manage and maintain the available storage space, handling the disparity between the erase unit size (block) and the read/write unit size (page). When a previously-written block is targeted for garbage collection, the valid data pages are gathered up and moved to another block in the memory 104, so that the block containing the invalid data pages can be fully erased.

Every time a non-contiguous logical block address (LBA) range is addressed by the host 300, a new input/output (I/O) command is sent to the data storage device 100 for each non-contiguous portion of the LBA range, which results in corresponding processing overhead. Eventually, as the file system gets more and more fragmented, the cumulative processing overhead can become large enough to reduce the overall performance of the data storage device 100. Here, the relevant fragmentation is not the physical fragmentation but rather the logical fragmentation of the file organization and/or structure in the file system.

The host's operating system can perform logical address defragmentation to prevent the file system from reaching the system's maximum file-system fragmentation tolerance. For example, when the host 300 determines that file system defragmentation is desired, driver logic in the host 300 can send a read request (e.g., a typical storage read command) for the logical region it intends to free (the source logical address), rewrite the same data to another logical address (the destination logical address) (e.g., using a typical storage write command), and subsequently erase (e.g., using a typical storage erase command) the source logical data in the device. (In data storage devices that follow the NVMe specification, copy and defragmentation commands are possible as well.) During this process, the data is moved from one range of logical addresses to another range of logical addresses through data copy to and forth, and the source region is freed. Likewise, the host 300 may perform this process multiple times to compact its file system to free a sequence of continuing logical addresses from its side to accommodate new files in the data storage device 100.

Figure 4:
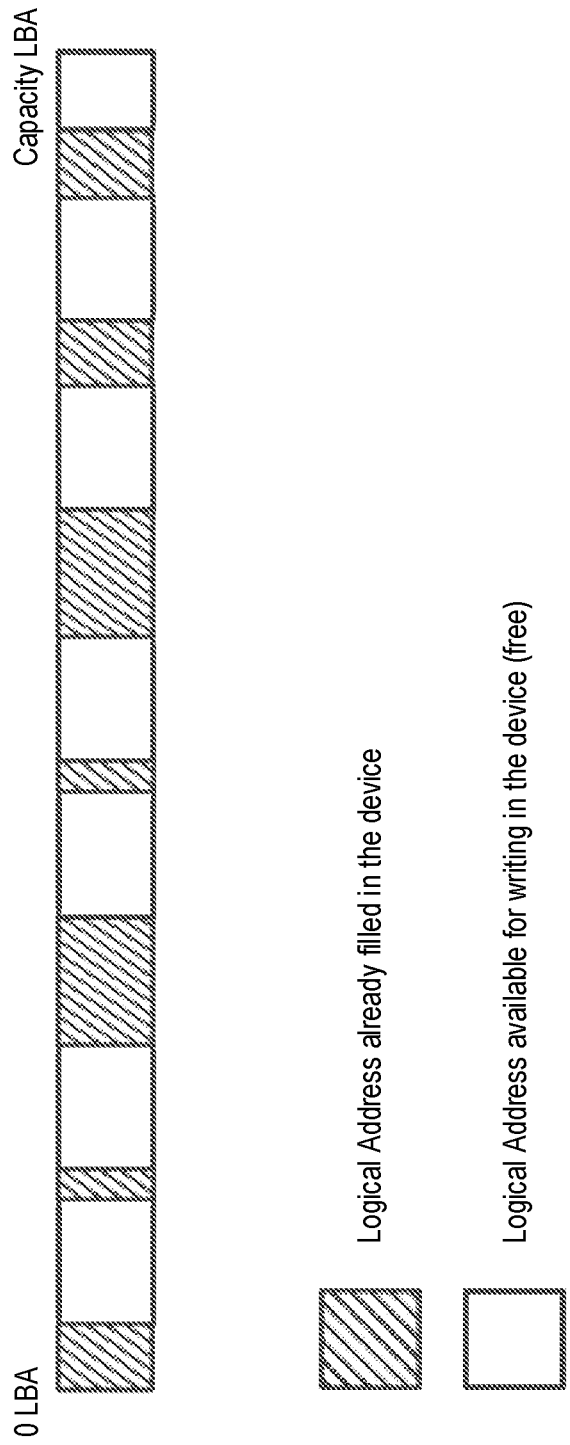
FIG. 4 is an illustration of a logically-fragmented memory of an embodiment.
Figure 5:
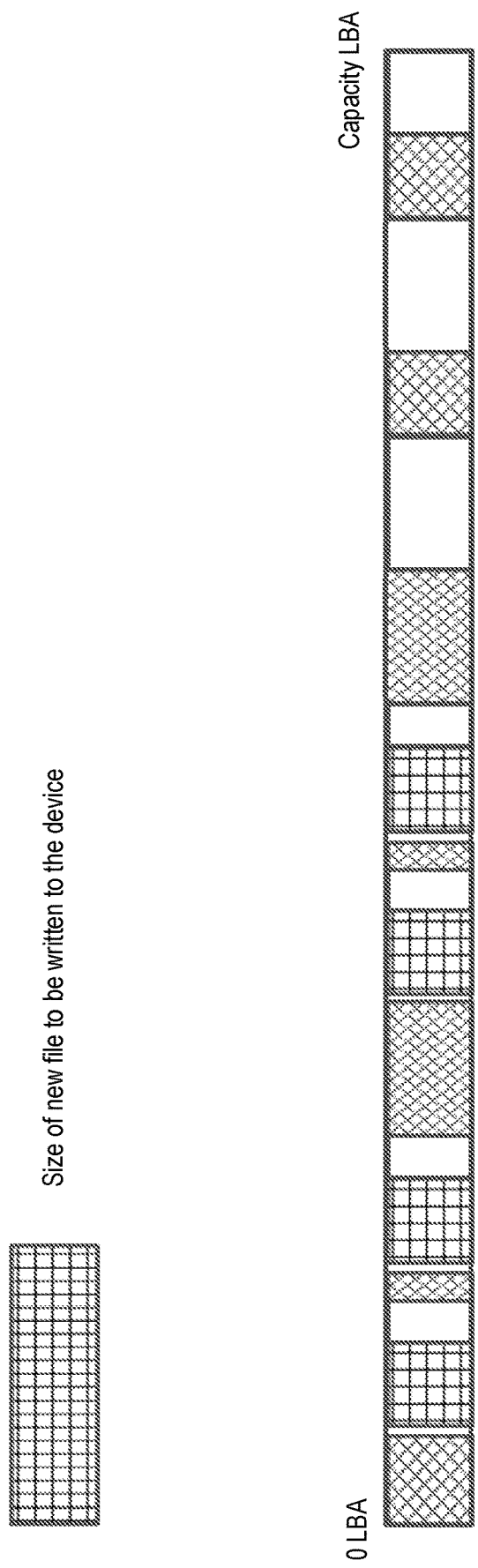
FIG. 5 is an illustration of storing a file in a logically-fragmented memory of an embodiment.

This process will now be described in conjunction with FIGS. 4-6. FIG. 4 shows a logically-fragmented memory, with available logical addresses in between filled logical addresses. As shown in FIG. 5, when the host 300 want to store a new file in the memory 104, the new file can be fragmented to fit in the available logical addresses (i.e., the file can be "chunked" into multiple, smaller portions and stored in the memory 104). However, this can increase the host's file system overhead because different write commands would need to be generated by the host 300 and sent to the data storage device 100 for every non-contiguous logical address. Also, such commands may be considered to be random by the data storage device 100. That is, the data storage device 100 will see the write as non-sequential even though the file is big enough to be sequential. This can have a negative effect on performance.

Figure 6:
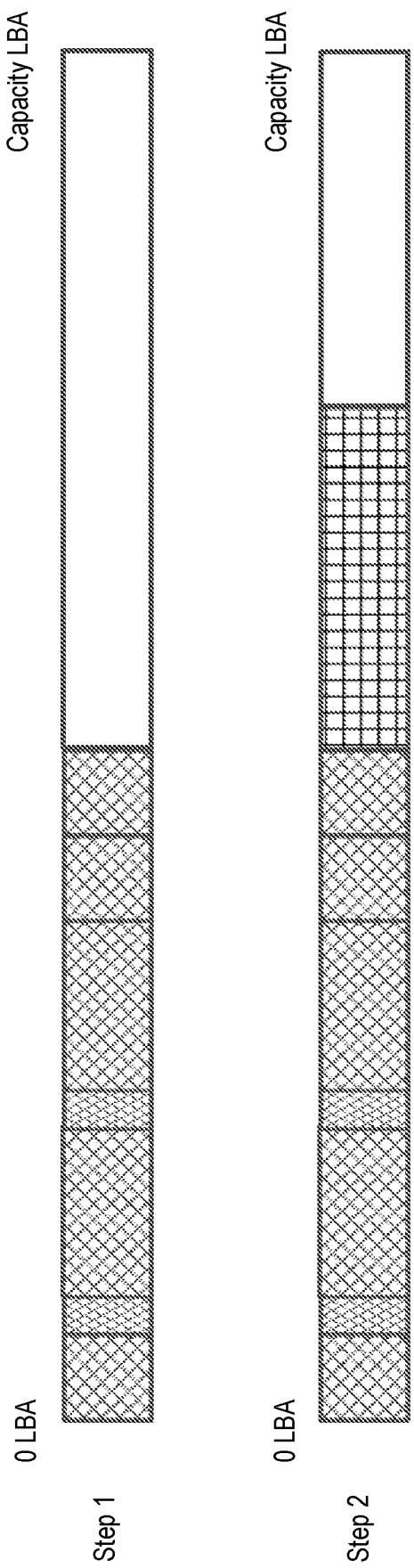
FIG. 6 is an illustration of a result of a logical address defragmentation method of an embodiment.

As shown in FIG. 6, to avoid this, the host 300 can ask the data storage device 100 to perform a file system/logical address defragmentation of the memory 104 prior to writing the new file (shown as "Step 1" in FIG. 6). This way, the new file can be written in contiguous logical addresses ("in one chunk") (shown as "Step 2" in FIG. 6). The advantage of this approach is that is requires much less file system overhead, and the data storage device 100 performs a sequential write because the file is a single, continuous logical address range. It should be noted that while FIG. 6 shows the original and new files completely defragmented, in some embodiments, a decrease in fragmentation less than total defragmentation is acceptable to reduce the number of data fragments in a file without completely eliminating fragmentation.

Consider the situation in which a video (e.g., mpeg) file is initially stored in logical block address (LBA) 1010000-1020000. To reduce logical defragmentation of the file, the controller 102 can move the file's data to LBAs to LBA 0-10000. Since a new file to be written does need not be broken into smaller logical chunks (due to defragmentation), the new file can be written sequentially by the host 300. To achieve this logical defragmentation, the underlying data does not need to be moved to different physical addresses in the memory 104 (i.e., the underlying data can be in the same physical addresses before and after the logical defragmentation operation). While the data may be fragmented in the physical memory 104, physical fragmentation may not be a problem for the host 300.

Figure 7:
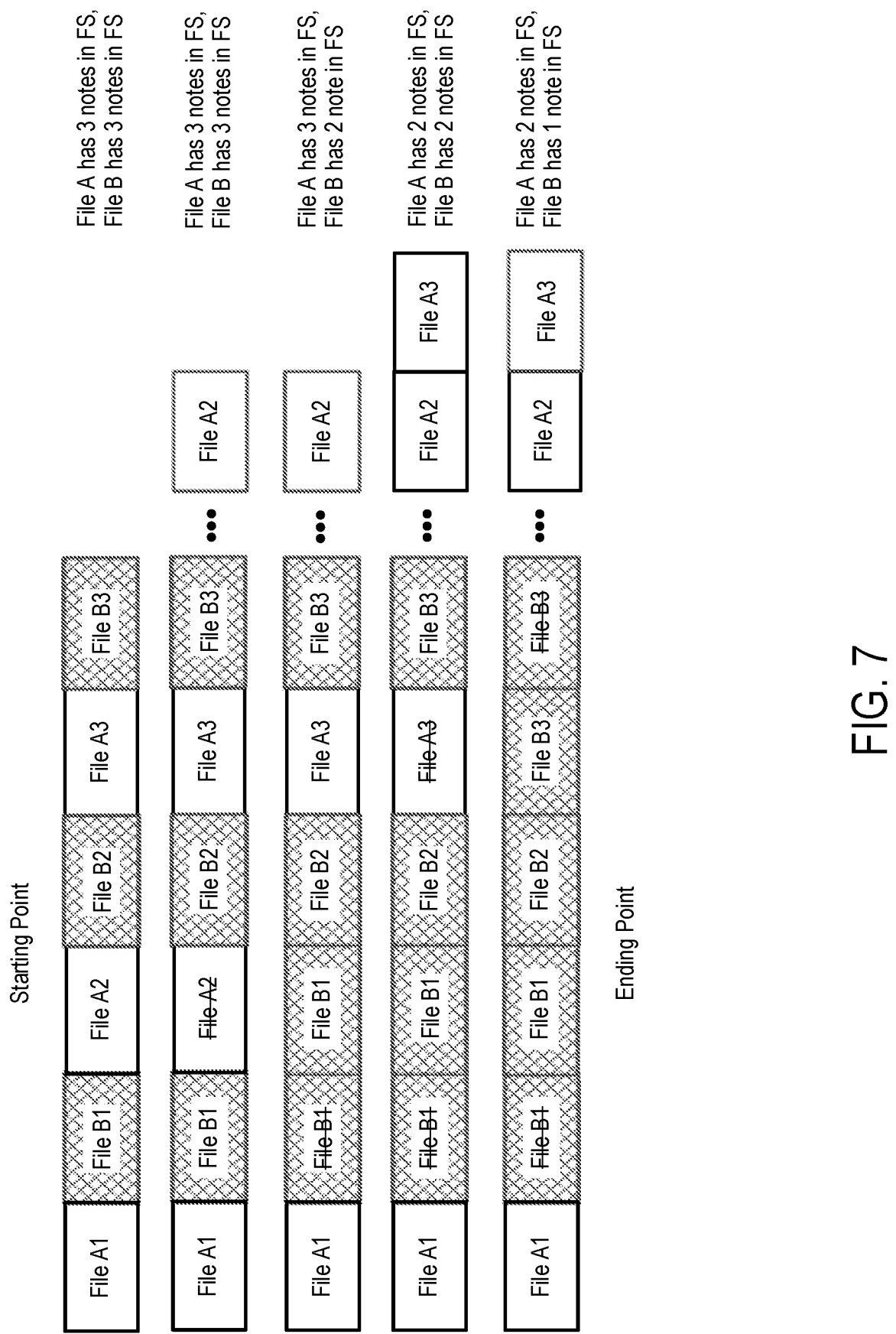
FIG. 7 is an illustration of a copy operation of an embodiment.

Logical address defragmentation can be achieved in any suitable way. For example, FIG. 7 illustrates copy operations that can be used to reduce logical address fragmentation. In FIG. 7, the memory 104 stores two files (File A and File B), each with three data fragments (A1, A2, A3; B1, B2, B3). As shown in FIG. 7, at the starting point in this example, none of the data fragments of either file are logically continuous. As such, each file as three separate logical address runs ("notes"). To reduce fragmentation and decrease the number of logical address runs of each file, various data fragments of File A can be copied to additional free logic space, and various data fragments of File B can be copied to logical locations that previously stored those data fragments of File A. This is illustrated in FIG. 7.

As shown in FIG. 7, data fragment A2 is copied to a new logical address, and data fragment B1 is copied to where data fragment A2 was originally located. Then, data fragment A3 is copied to a new logical address, and data fragment B3 is copied to where data fragment A3 was originally located. The end result is a decrease in logical fragmentation of both files, with File A having two notes and File B having one note, instead of each originally having three notes. So, in this example, four copy operations are used to move from six separate file fragment runs to three file fragment runs. However, as shown above, this method requires the use of additional logical space (in this example, to store A2 and A3) and results in "holes" in the logical address space (in this example, where B1 and B3 were "trimmed" and left as blank). This increases overhead. Further, if the blank logical addresses are later used to store data of another file, that would result in further fragmentation.

To address these issues, in one embodiment, the host 300 can send the data storage device 100 a "swap request" is executed to reduce logical fragmentation of files stored in the memory 104. The swap request can identify first and second logical addresses to be swapped, where the first logical address is associated with a data fragment of the first file and the second logical address is associated with a data fragment of the second file. In executing the swap request, the controller 102 would do a swapping or reassociation of the logical addresses. More specifically, the controller 102 can (i) associate the first logical address with the data fragment of the second file instead of the data fragment of the first file and (ii) associate the second logical address with the data fragment of the first file instead of the data fragment of the second file. This is shown in FIG. 8.

Figure 8:
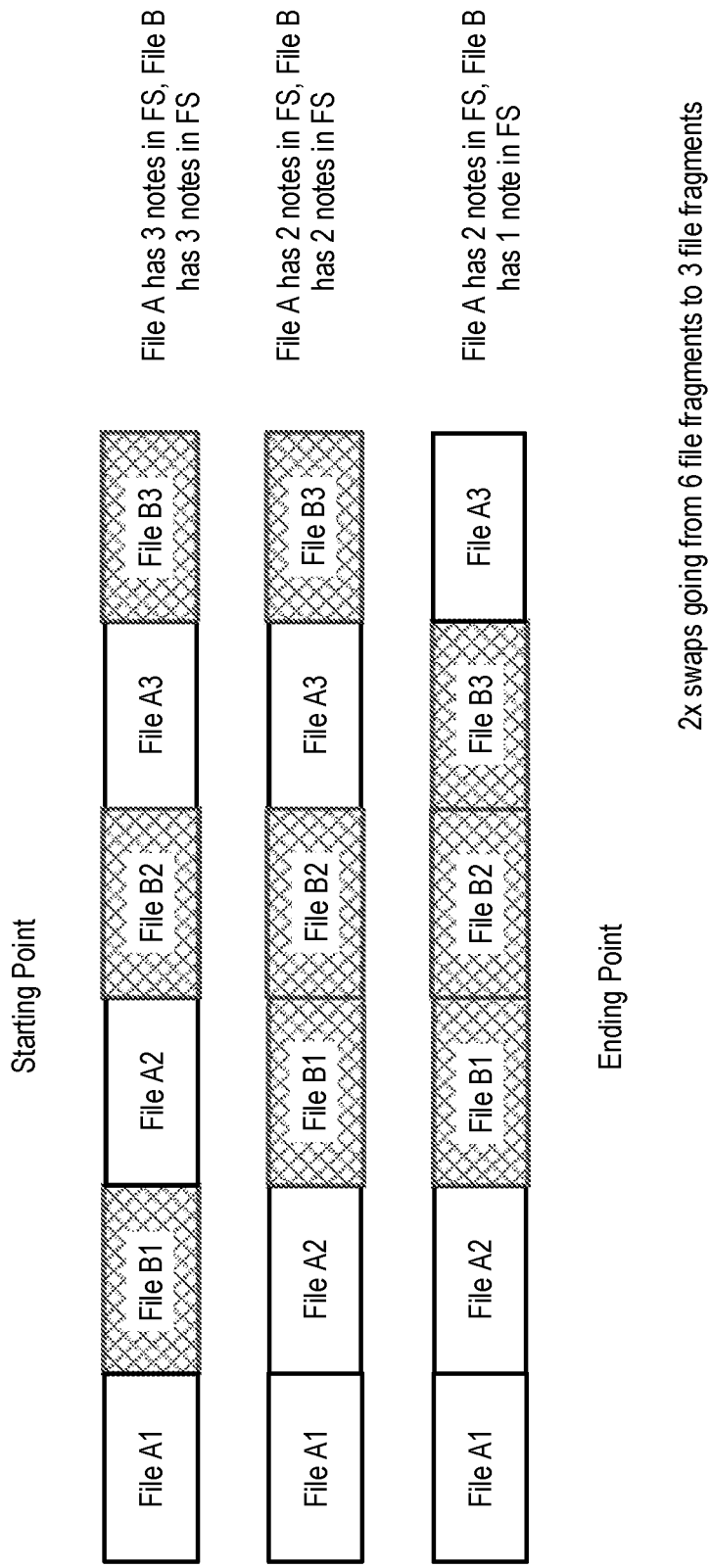
FIG. 8 is an illustration of a swap operation of an embodiment.

As shown by a comparison of FIGS. 7 and 8, using an internal swap operation to reduce logical defragmentation has several advantages over copying data to new logical addresses. For example, because the swap operation only uses the logical addresses occupied prior to the swap operation (A←→B), a swap operation can be executed without requiring additional logical addresses. This provides an advantage in memories where there is a limitation on free space. The swap operation also provides an advantage in terms of tracking. For example, copying data to new logical addresses to reduce defragmentation involves three logical locations: one temporary location to copy data into and the two locations where data is noted (B→C, A→B, C→A). If the temporary location is not known to be temporary or the path is not very direct, the controller 102 may end up needing to track more changes. As the number of changes that the controller 102 is capable of tracking can be limited, it is quite possible that the use of copy, which can have an 50% overhead in tracking versus swaps, can force the controller 102 to perform internal garbage collection to update the metadata associated with the logical block addresses that have been changed.

In summary, with a swap operation, files can be defragmented without leaving a number of "holes" between filled logical addresses of files. Also, a swap operation can take place in fewer steps, without trims, and does not require the additional free space to write the file parts being copied. So, a swap operation can be particularly useful in defragmentation of large files and/or situations where there is little free space.

It is important to note that the "swap request" can take any suitable form. For example, in some embodiments, the swap request takes the form of a command (e.g., a command specified in a standard or a vendor-specific command) that has one or more fields, and the addresses to be swapped are written in those fields. For example, the swap command can have a target address field that stores the first logical address and a payload field that stores the second logical address. As another example, the swap command can have a payload field that stores the first and second logical addresses. As yet another example, the swap command takes the form of a standard write command (with a different opcode), but in place of the pointer (PRP, SGL, etc.) to the data that is to be written, the LBA of the swap could be there. This avoids the need for a payload and the associated transfer.

In one embodiment, the swap request takes the form of a plurality of fused copy commands, where the copy commands are executed together as a single transaction. In another embodiment, the swap request takes the form of a plurality of separate copy commands (e.g., back-to-back copy commands or non-sequential copy commands that are defined as a swap request). For example, a plurality of separate copy commands can be identified by the controller 102 as being part of the swap request if they are located sequentially in a submission queue (i.e., if they are written into the submission queue immediately following each other).

If the plurality of separate copy commands are located non-sequentially in a submission queue, the controller 102 can identify them as being part of the swap request if the commands are close enough to each other in the submission queue that they can be interpreted as a swap request. For example, the controller 102 can be configured to detect a collision in logical addresses in the plurality of separate copy commands in the submission queue (one command copying logical address A→logical address B, and the other command copying logical address B→logical address A), Such colliding copy commands can be interpreted by the controller 102 as a swap request, and the colliding copy commands can be executed together as a swap command instead of executing the two copy commands separately over a longer time period. As another example, two copy commands can be considered a swap request if they are "nearby" in the submission queue (e.g., when they are within the same doorbell ring and well within an ingestion amount from the submission queue). Other thresholds can be set to reduce the likelihood of misinterpreting separate commands as being part of a swap request and thereby losing data. However the copy commands in a submission queue are recognized as being part of a swap request, after the copy commands have been recognized and executed, the controller 102 can place a specific status in a completion queue to indicate that a swap request was detected and executed, thereby closing the loop with the host 300.

It is important to note that the swap request can be executed in any suitable way and may or may not involve moving the data fragments of the first and second files to different physical addresses in the memory 104. That is, while the logical addresses of the data subject to a swap request are changed, the physical addresses in the memory 104 that store the data may or may not change. U.S. patent application Ser. Nos. 17/865,641 and 17/865,660, both filed on Jul. 15, 2022 and hereby incorporated by reference, describe various techniques that can be used to change the logical address of data without moving the data to a different physical address of the memory 104. The following paragraphs provide a brief overview of some of those techniques. It is important to note that these are merely examples, and other/different techniques can be used. Further, none of these techniques should be read into the claims unless explicitly recited therein.

Figure 9:
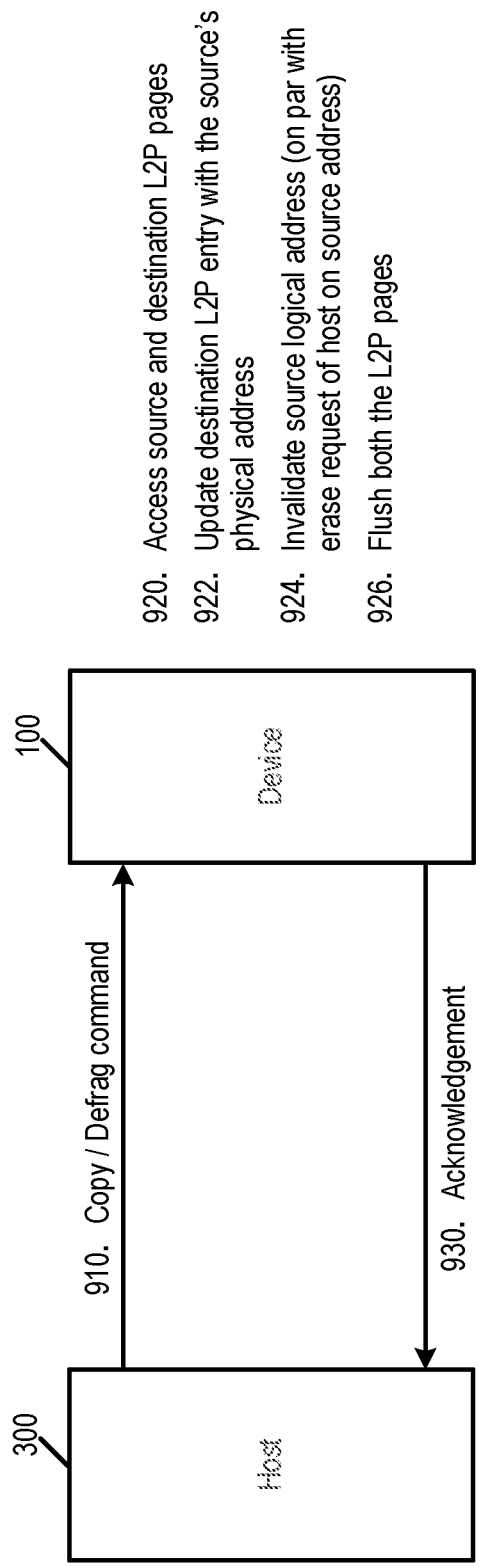
FIG. 9 is a block diagram illustrating a method of an embodiment for swapping logical addresses without moving data in a memory.

One example of executing a swap request without physically moving data is illustrated in FIG. 9. As shown in FIG. 9, in response to a swap (e.g., copy or defragmentation) command from the host 300 (act 910), the controller 102 in the data storage device 100 access the logical-to-physical (L2P) address translation pages that contain the source and destination logical addresses in the swap command (act 920). The controller 102 can read the pages from the non-volatile memory 104 and store them in volatile memory (in the data storage device 100 or host 300) for faster access and processing. The controller 102 then updates the destination L2P entry with the source's physical address (act 922), invalidates the source logical address (act 924), and flushes both L2P pages from the volatile memory back to the non-volatile memory 104 (act 926). The controller 102 then sends an acknowledgment back to the host 300 (act 930).

So, in this example, upon receiving a swap command from the host 300, the controller 102 fetches source and destination L2P pages, updates the destination logical address space with the physical address of the source logical space, and invalidates the source logical space. In this way, the controller 102 only makes "reference adjustments" to the logical addresses and does not actually move the data in the memory 104, thereby providing a straightforward approach that involves only adjusting L2P table entries (e.g., src1→dst1 and dst1→src1) and avoids executing multiple input-output (IO) commands to physically move the data in the memory 104.

A problem can arise when this method is used in data storage devices that tag written data with its associated logical address for end-to-end protection/data verification purposes. This can result in a mismatch between the stored logical address and the adjusted logical address when the data is later read from the memory 104, falsely indicating a data verification problem. To address this, a separate table (a "lookaside table") can be used to identify those logical addresses that have been swapped, so they can be treated differently. This lookaside table can be consulted during reads or when end-to-end protection fails to check if the logical address involved was associated with a previously-executed swap request. This is illustrated in the example in FIG. 10.

Figure 10:
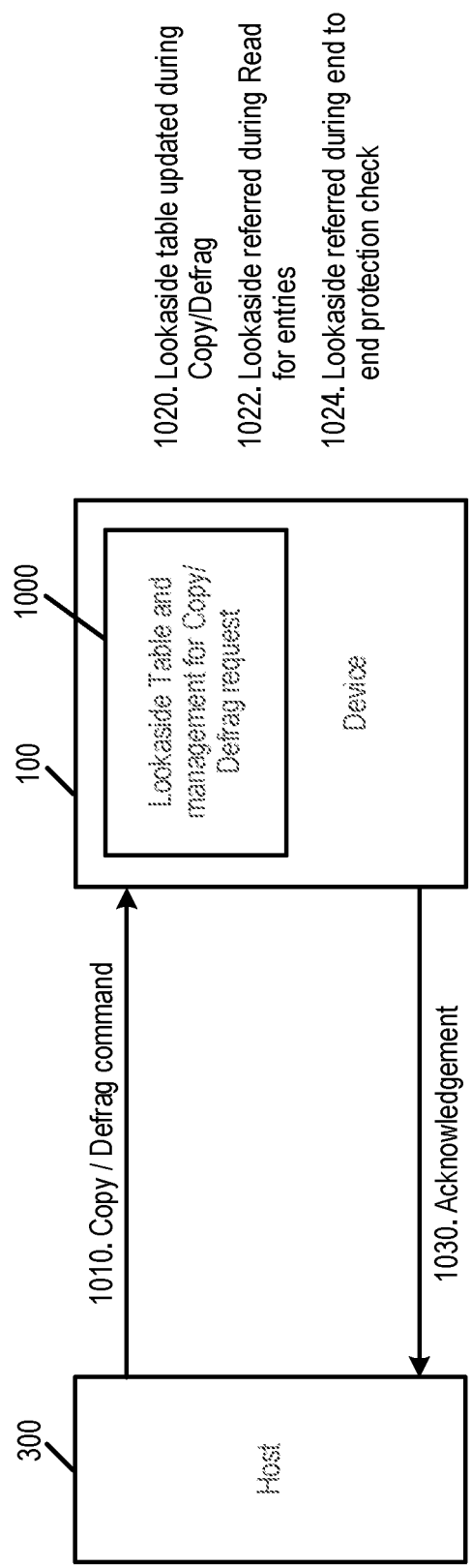
FIG. 10 is a block diagram illustrating a method of an embodiment using a lookaside table.

As shown in FIG. 10, in response to receiving a swap request (e.g., a copy/defrag command) from the host 300 (act 1010), the controller 102 executes the swap request and then updates a lookaside table 1000 to note which addresses were involved in the swap operation (act 1020). This lookaside table 1000 can associate the source logical address with the destination logical address of the swap command. Later, the controller 102 refers to the lookaside table 1000 during a read operation to see if the logical address in the read command in listed in the lookaside table 1000 (act 1022). (Alternatively, the lookaside table 1000 can be referenced only when the end-to-end protection fails to verify.) If the logical address is not in the lookaside table 1000, the read proceeds as normal, with the logical address being compared to the tagged logical address in the read data for read verification purposes. However, if the logical address is in the lookaside table 1000, the controller 102 can use the destination logical address from the lookaside table 1000 instead of the tagged logical address to perform read verification (act 1024). This prevents the "false positive" situation noted above.

Figure 11:
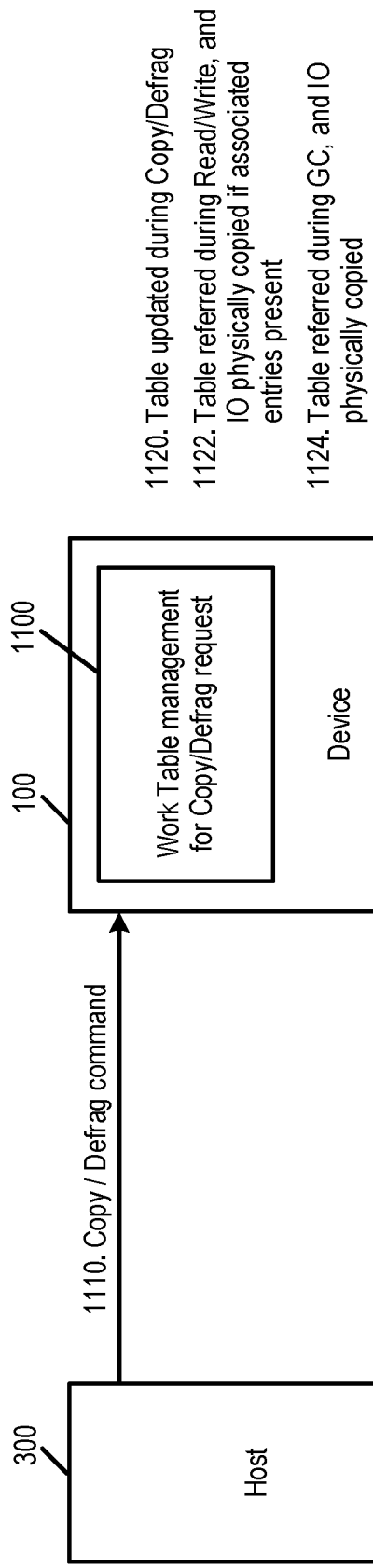
FIG. 11 is a block diagram illustrating a method of an embodiment for moving data in a memory in response to a read command.

In some embodiments, only the logical addresses of data are swapped, and the underlying data of the swap operation is not physically moved in the memory 104. However, in other embodiments, the underlying data is physically moved in the memory 104. For example, as shown in FIG. 11, the controller 102 can manage a worktable that is used in a "just-in-time" physical copy operation. In this example, after the controller 102 of the data storage device 100 receives and executes a swap command (e.g., a copy/defrag command) (act 1110), the controller 102 updates a worktable 1100 that indicates which logical addresses were affected by the swap operation (act 1120). The controller 102 can access the worktable during reads and writes and physically move the data in the memory 104 (act 1122). The controller 102 can also access the worktable during garbage collection operations (act 1124).

So, in this method, the controller 102 manages a control structure (worktable) that maintains the source and the destination LBAs associated with a swap command but does not physically move the data in the memory 104. When a read command is received, instead of performing a typical logical-to-physical address translation on the logical address of the read command, the controller 102 access the worktable to determine if the logical address of the read command is present in the worktable. If it is, the controller 102 can physically move the data in the memory 104 and then execute the read operation. That is, by using a just-in-time-copy-on-read, the controller 102 can defer physically moving the data in the memory 102 and trigger a synchronous physical copy for the affected logical block addresses when read (e.g., as a background operation).

Various conditions can trigger physical move of data, such as, but not limited to, reading a designated logical block address, a write to an invalid source LBA (flush to avoid race conditions), and a garbage collection operation. With this embodiment, only the relevant data can be physically copied, with the rest of the data only logically managed, thereby improving the IO of the system. Further, if any invalidation of LBAs happen prior to a read, the entries can simply be thrashed in the control structure, not resulting in any IO transfers.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional (2D) memory structure or a three-dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A data storage device comprising:
   a memory; and
   a controller coupled with the memory and configured to:
      receive a swap request to reduce logical fragmentation of first and second files stored in the memory, wherein the swap request identifies first and second logical addresses to be swapped, the first logical address being associated with a data fragment of the first file and the second logical address being associated with a data fragment of the second file; and
      execute the swap request by:
         associating the first logical address with the data fragment of the second file instead of the data fragment of the first file; and
         associating the second logical address with the data fragment of the first file instead of the data fragment of the second file.

2. The data storage device of claim 1, wherein the swap request comprises a plurality of fused copy commands.

3. The data storage device of claim 1, wherein the swap request comprises a plurality of separate copy commands.

4. The data storage device of claim 3, wherein the plurality of separate copy commands are identified as being part of the swap request by being located sequentially in a submission queue.

5. The data storage device of claim 3, wherein the plurality of separate copy commands are located non-sequentially in a submission queue and are identified as being part of the swap request by detecting a collision in logical addresses in the plurality of separate copy commands.

6. The data storage device of claim 1, wherein the swap request comprises a vendor-specific command.

7. The data storage device of claim 1, wherein the swap request comprises a command with a target address field that stores the first logical address and a payload field that stores the second logical address.

8. The data storage device of claim 1, wherein the swap request comprises a command with a payload field that stores the first and second logical addresses.

9. The data storage device of claim 1, wherein the swap request comprises a write command comprising a pointer field, wherein the first or second logical address is provided in the pointer field instead of a pointer to data to be written.

10. The storage system of claim 1, wherein the controller is further configured to execute the swap request by moving the data fragments of the first and second files to different physical addresses in the memory.

11. The data storage device of claim 1, wherein the controller is further configured to execute the swap request without moving the data fragments of the first and second files to different physical addresses in the memory.

12. The data storage device of claim 1, wherein the memory comprises a three-dimensional memory.

13. In a data storage device comprising a memory storing a data fragment of a first file and a data fragment of a second file, wherein a first logical address is associated with the data fragment of the first file and a second logical address is associated with the data fragment of the second file, a method comprising:
   receiving a request to reduce logical fragmentation of the first and second files; and
   executing the request by swapping the first and second logical addresses.

14. The method of claim 13, wherein the request is executed by moving the data fragments of the first and second files to different physical addresses in the memory.

15. The method of claim 13, further comprising moving the data fragments of the first and second files to different physical addresses in the memory in response to a command to read the first or second logical address after the request has been executed.

16. The method of claim 13, wherein the request is executed by associating the first logical address with a physical address in the memory that stores the data fragment of the second file and associating the second logical address with a physical address in the memory that stores the data fragment of the first file.

17. The method of claim 13, wherein:
   the data fragments of the first and second files are stored in the memory with tags that identify the first and second logical addresses, respectively, and are used for read verification; and
   the method further comprises, in response to receiving a command to read the first or second logical address:
      consult a data structure that indicates that the first and second logical addresses have been swapped; and
      use the first logical address used instead of the second logical address, or vice versa, for read verification against a stored tag.

18. The method of claim 13, wherein executing the request decreases logical fragmentation of the first and second files without creating holes in logical addresses of the first and second files.

19. The method of claim 13, wherein the request is executed without using additional logical space.

20. A data storage device comprising:
   a memory that stores a data fragment of a first file and a data fragment of a second file, wherein a first logical address is associated with the data fragment of the first file and a second logical address is associated with the data fragment of the second file; and means for swapping the first and second logical addresses to reduce logical fragmentation of the first and second files without moving the data fragments of the first and second files in the memory.

\* \* \* \* \*